United States Patent [19]

Weaver

[11] Patent Number: 4,948,193

[45] Date of Patent: Aug. 14, 1990

[54] SLIDABLE TRUCK COVER ASSEMBLY

[75] Inventor: Robert C. Weaver, Port Matilda, Pa.

[73] Assignees: Robert C. Weaver, Port Matilda; Robert Semion, State College; John H. Imbt, State College; Marlin K. Gingrich, State College, all of Pa.

[21] Appl. No.: 384,650

[22] Filed: Jul. 25, 1989

Related U.S. Application Data

[63] Continuation of Ser. No. 139,444, Dec. 30, 1987, Pat. No. 4,858,984, which is a continuation-in-part of Ser. No. 888,001, Jul. 22, 1986, Pat. No. 4,725,090.

[51] Int. Cl.$^5$ .............................................. B60P 7/03
[52] U.S. Cl. ..................................... 296/100; 296/105
[58] Field of Search .............................. 296/100, 105

[56] References Cited

U.S. PATENT DOCUMENTS

| | | | |
|---|---|---|---|
| 1,827,057 | 10/1931 | Woolcott | 296/105 |
| 2,406,737 | 9/1946 | Bramble | 296/105 |
| 2,469,958 | 5/1949 | Fowler | 296/105 |
| 3,298,732 | 1/1967 | Openshaw | 296/100 |
| 4,215,897 | 8/1980 | Aicken et al. | 296/100 |

Primary Examiner—Robert R. Song
Attorney, Agent, or Firm—John F. A. Earley; John F. A. Early, III; P. Michael Walker

[57] ABSTRACT

A cover assembly installable on the open bed of trucks adapted to be mechanically drawn over or withdrawn from the top of the truck bed by means of a pulley operated looped cable attached to a movable tarpaulin. Lateral, front and rear enclosure members are connected with said tarpaulin so that in the drawn position, the interior of the truck bed is completely covered.

15 Claims, 5 Drawing Sheets

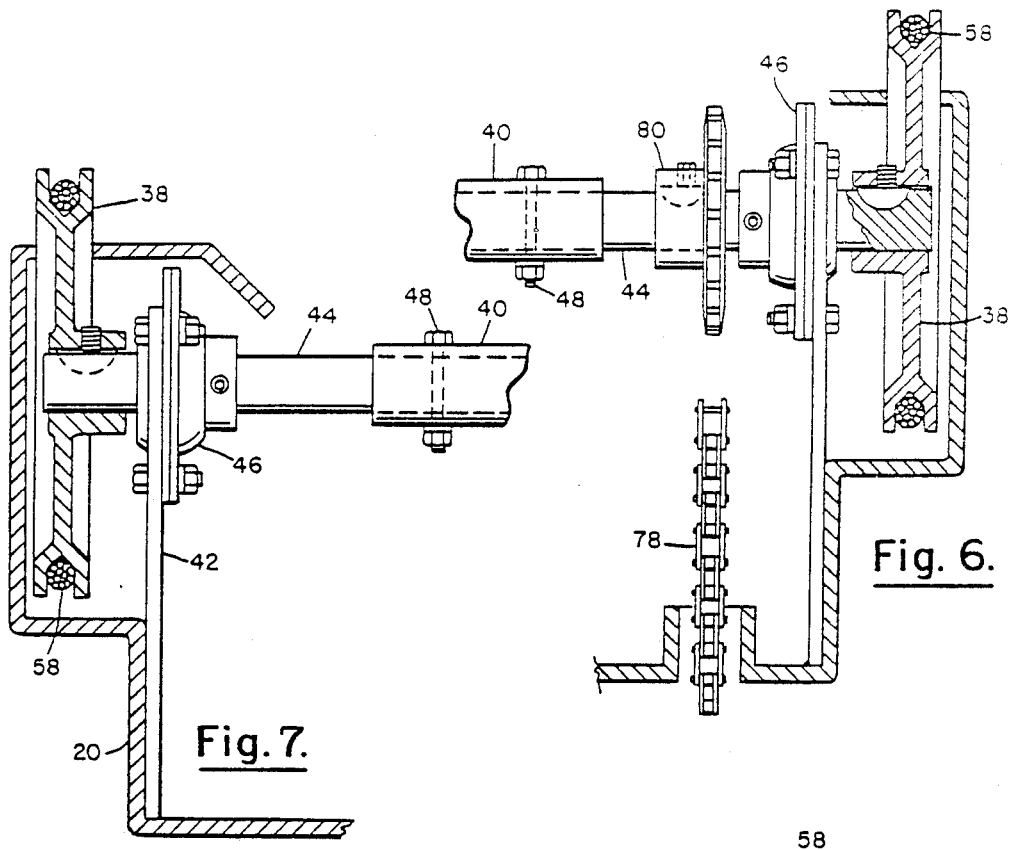
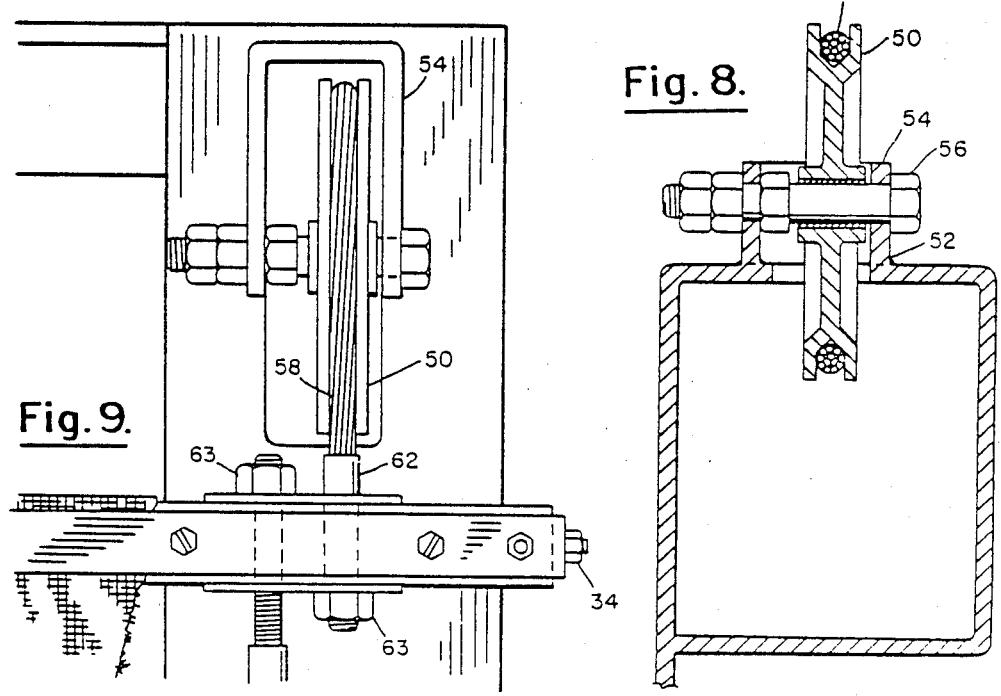

SLIDABLE TRUCK COVER ASSEMBLY

This is a continuation of Ser. No. 139,444 filed Dec. 30, 1987, now U.S. Pat. No. 4,858,984, which is a continuation-in-part of my U.S. Pat. application Ser. No. 888,001, filed on Jul. 22, 1986, now U.S. Pat. No. 4,705,090.

BACKGROUND OF THE INVENTION

The inventor knows of the following U.S. Pat. Nos. related to this invention and discovered during a preliminary patent search: 4,215,897 4,189,178 4,341,416 4,162,100. The inventor is not withholding an other known prior art which he considers anticipates this invention.

This invention relates to a new covering system for trucks and in particular to a covering system which allows a tarpaulin cover to be mechanically drawn or withdrawn from the top portion of the truck bed.

The use of truck covering has long been recognized as a necessity for trucks. It is particularly true in dump trucks carrying loose sand, gravel, stones and the like. In particular, trucks carrying asphalt are frequently required by law to be appropriately covered.

This invention is a unique device for mechanically covering and uncovering the bed of a truck. In its covered phase the device will completely enclose and cover the truck bed area allowing no opening. The advantages and features of this device are that it reduces driver fatigue in covering the truck bed and also reduces risk of injury considerably.

The driver can place the tarpaulin over the load in the truck bed by turing a hand crank placed near the cab door. Turning the crank in one direction moves the tarpaulin over the load. Turning the crank in the reverse direction removes the tarpaulin from over the load. The device will fit most dump trucks on the market today. One advantage is that it is not over-width (96 inches).

The system works similarly to a curtain rod. It has a support member on each side, which is also used as a guide rail for tarpaulin supports to slide on. It has a pulley on each end of the guide rail, the cable is attached around the pulleys—one assembly on each side of the truck bed. The cable runs through a number of wooden slats (the actual number depends on the length of the truck bed). The slats have holes drilled near the ends to allow the cable to slide freely through them. The rear most slat is attached to the cable so when the cable is moved in either direction the slat moves with it. With the attached slat to the rear of the truck, the remainder of the slats are spaced about two feet apart—between the front pulleys and the rear most slat.

The tarpaulin being persized for the truck, is fastened at the front end near or in line with the front cable pulleys. It is spread over the slats and fastened to the prespaced slats. The slats have a small metal device attached to the end allowing the tarpaulin to come down over the sides of the truck bed 4 to 6 inches to completely cover the truck bed. With tarpaulin in place and fastened, it simply covers or uncovers the load by rotating the cable.

The cable assembly is rotated by a simple chain drive assembly. The two front cable pulleys are attached rigidly to a cross shaft. On this shaft is attached a chain sprocket. Near the left hand door of the truck cab is attached another sprocket of the same size as the one on the tarpaulin cross shaft. The sprocket is attached under the cab shield by the front of the truck bed by means of a pair of bearings—short shaft—and a fabricated bracket. The two sprockets are connected with a suitable roller chain.

A hand crank handle is fashioned to fit over the drive sprocket shaft. The crank handle is designed so it is removable when not in use, thus not sticking out beyond legal which of truck bed. The crank shaft has a simple locking device to prevent tarpaulin moving from forward or rear position until unlocking of shaft allowing it to turn. It should be noted that the tarpaulin extends over the sides of the truck to completely enclose the covered contents.

An important feature of this invention is that the tarpaulin covers and seals or encloses the top portion of the side walls, front and rear walls of the truck bed when in the extended covering position. This is done by securing the sides of the tarpaulin to L-shaped tarpaulin supports attached to the end of each slat. These tarpaulin supports extend downwardly over the side of the truck bed and hold the tarpaulin over the truck bed.

It is an object of this invention therefore to construct a device which will cover the top, sides and ends of a truck bed without the use of additional fasteners or straps.

It is still another object of this device to provide a truck covering mechanism which will extend over the sides, front and rear of the truck bed to completely cover its contents.

It is yet another object of this invention to provide a cable tension adjusting mechanism which will easily and simply vary the tension of the operating cables of the device.

It is another object of this invention to provide a simple to use and easy cover for a truck that may be mechanically drawn over a truck bed or removed from the truck bed in seconds.

It is another object of this device to reduce driver fatigue and injuries by allowing the manipulation of the device from near the truck cab.

It is yet another object of this invention to provide a truck covering device, installable on most trucks, in which all lateral operating mechanisms are completely covered by the truck frame and body.

It is still another object of this invention to provide a truck covering device which will not extend beyond in width the legal width limit of a truck.

BRIEF DESCRIPTION OF THE DRAWINGS

These and other objects of the invention will become apparent by references to the following drawings in conjunction with the foregoing description in which:

FIG. 6, is a view taken along line 6—6 of FIG. 2.

FIG. 7, is a view taken along line 7—7 of FIG. 2.

FIG. 8, is a cross-sectional view taken along line 8—8 of FIG. 3.

FIG. 9, is a top view taken along line 9—9 of FIG. 3.

DETAILED DESCRIPTION

Figures 1, 2:
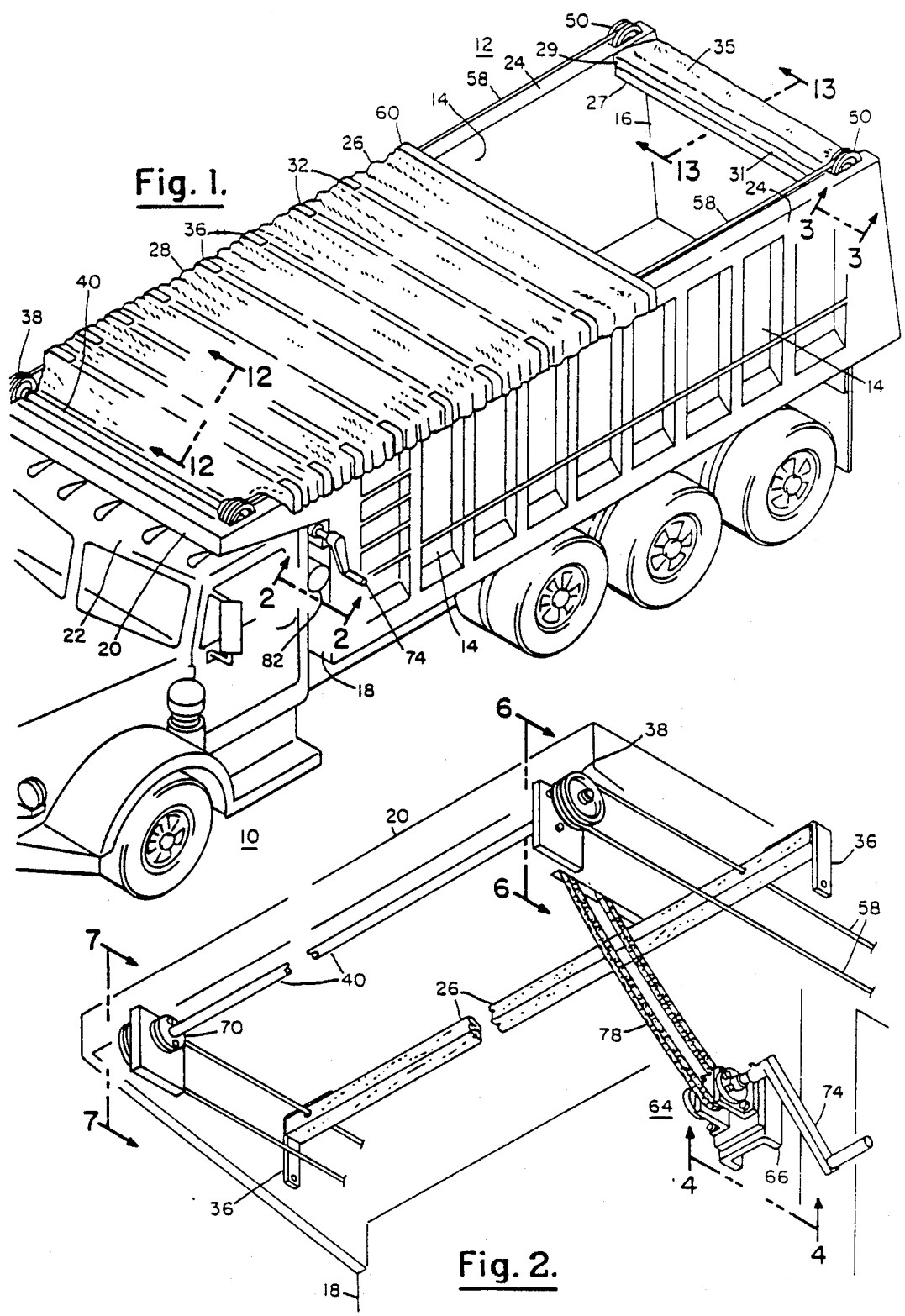
FIG. 1, is a perspective view of a dump truck upon which has been installed the present invention.
FIG. 2, is a perspective drawing taken along line 2—2 of FIG. 1.

Referring to the drawings and in particular to FIG. 1, 10 represents a conventional dump truck having a bed 12 with two side walls 14, a rear wall 16 and a front wall 18. A cab shield 20 extends from the front wall 18 to partially cover the truck cab roof 22. Two hollow lateral support members 24 extend from the cab shield 20 along the top portion of the side walls 14 to the rear wall 16.

Figure 12:
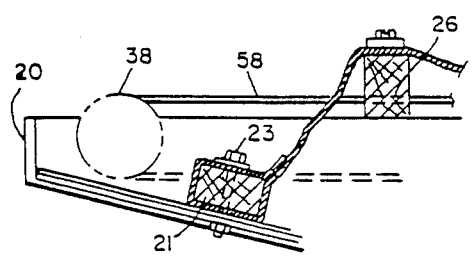
FIG. 12, is a lateral view taken along line 12—12 of FIG. 1 showing tarpaulin cover attached to the cab shield.
Figure 10:
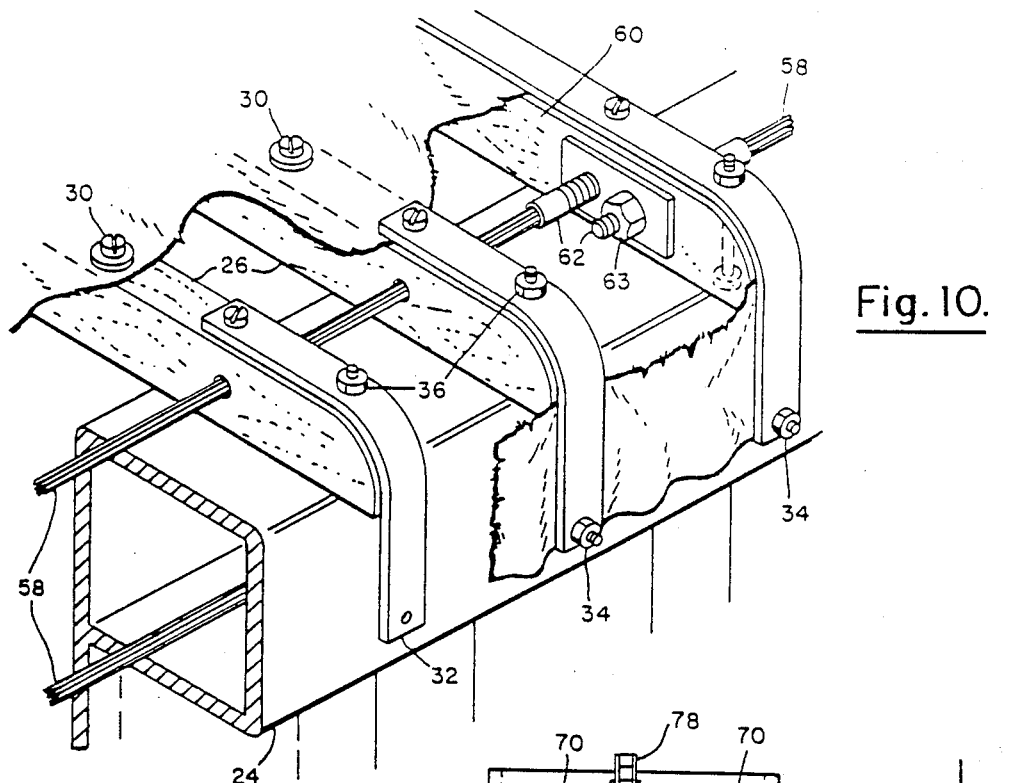
FIG. 10, is a perspective view, in section partially, of the lateral portion of the tarpaulin system set forth in FIG. 1.

A plurality of slats 26 extends transversely between the lateral support members 24. These are covered and attached to a flexible tarpaulin 28 by means of screws 30 extending through the tarpaulin 28 and into the slats 26. (see FIG. 10) A plurality of L-shaped lateral tarpaulin supports 32 are attached to each end portion of each slat 26 by bolts 36 and extend downwardly over the edge of hollow lateral support members 24. Tarpaulin 28 is attached to the end portion of lateral tarpaulin supports 32 by means of lateral bolts 34 extending through both lateral tarpaulin support 32 and tarpaulin 28. Tarpaulin 28 also extends from the cab shield 20 to the rear wall 16, supported by slats 26 positioned at about two foot intervals along the support members 24. Tarpaulin 28 is attached to cab shield 20 by clamp member 21, as shown in FIG. 12, which extends the width of the cab shield 20. Clamp bolts 23 extend through tarpaulin 28, clamp member 21 and into cab shield 20 to clamp tarpaulin 28. Thus in its extended phase, the tarpaulin 28 extends completely over the top of truck bed 12 and over the side of the side walls 14 to completely enclose the contents of bed 12. As may be seen, L-shaped lateral tarpaulin supports 32 extend over the top of tarpaulin 28, over the sides of hollow lateral support members 24 and are secured to slats 26 by means of bolts 36.

Figure 13:
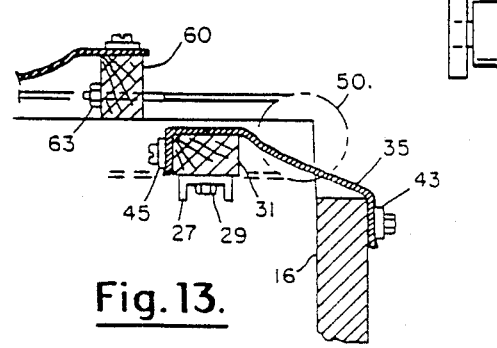
FIG. 13, is a lateral view taken along line 13—13 of FIG. 1 showing attachment of the stationary tarpaulin cover on the rear of the truck bed.

Referring to FIGS. 1 and 13, a channel member 27 welded to each side wall 14, extends across the bed 12. Rear retaining member 31 (usually wood) is bolted to channel member 27 by bolts 29. Stationary tarpaulin cover 35 (FIG. 13) extends from retaining member 31 to the outer portion of rear wall 16 where it is bolted by rear wall bolts 41 which pass through a transverse rear retaining strip 43 and into rear wall 16. The other end portion of stationary tarpaulin cover 35 is transversely bolted to retaining member 31 through a top retaining strip 45 which extends across the truck bed 12. When the tarpaulin 28 is in its extended position, rear slat 60, and tarpaulin 28 extend over rear retaining member 31 and stationary tarpaulin cover 35, thus sealing or shielding the rear portion of bed 12 from the outside. Likewise the front portion of tarpaulin cover 28 is clamped to cab shield 20 sealing or shielding the front portion of bed 12 from the outside. Hence, in its extended position tarpaulin 28 completely seals or encloses bed 12 on the front, rear and sides.

Figure 3:
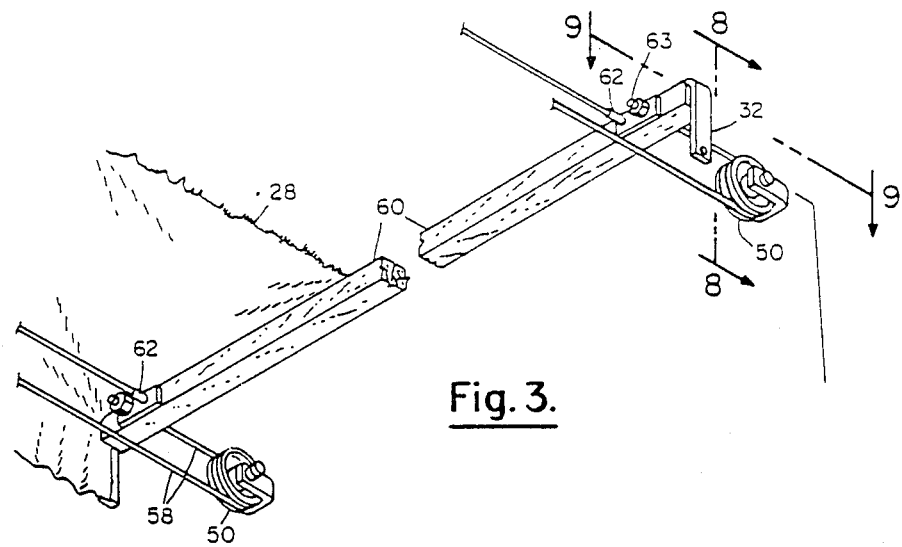
FIG. 3, is a perspective view taken along line 3—3 of FIG. 1.
Figure 5:
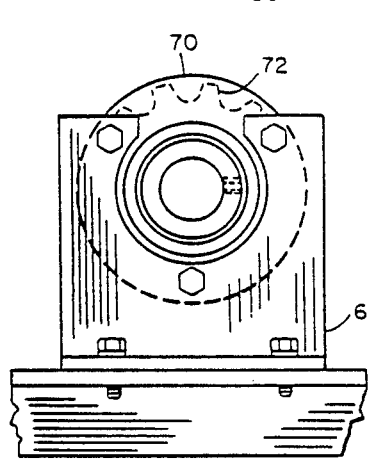
FIG. 5, is a lateral view of FIG. 4.
Figure 4:
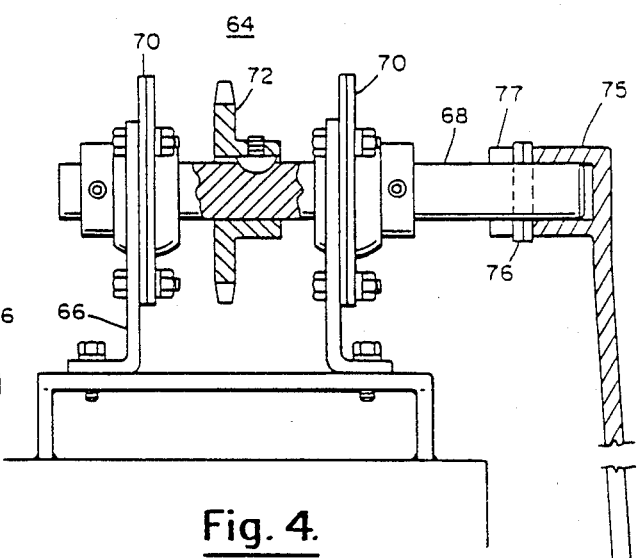
FIG. 4, is a view taken along line 4—4 of FIG. 2.

The mechanism for extending and retracting the tarpaulin 28 is as follows: Referring to FIGS. 2, 6, 7, 8 and 9, two forward pulleys 38 connected by a hollow shaft 40 are attached to lateral portions of cab shield 20 by means of forward pulley brackets 42. Forward pulleys 38 are attached to a short shaft 44 extending through a bearing 46 and attached to hollow shaft 40 by means of a shaft pin 48 which extends through hollow shaft 40 and short shaft 44. As shown in FIGS. 3, 8, and 9, rear pulleys 50 are attached to either side of the rear portion of hollow lateral support members 24 by means of brackets 52. Rear pulleys 50 are attached to rear brackets 52 by means of rear bearing bolt 56 extending through rear bearing 54 within rear pulley 50.

A looped cable 58 (FIGS. 9 and 13) extends around forward pulleys 38 and rear pulleys 50 in a loop-like fashion and are attached to rear slats 60 by means of threaded rods 62 and nut 63. Threaded rods 62 are hollowed out, the ends of cable 58 inserted and sweat welded together. Threaded rods 62 then extend through rear slat 60. Nut 63 is screwed on threaded rod 62 to bear against rear slat 60 and tighten cable 58. The tensions on cable 58 (FIG. 10) may be varied by turning nuts 63. The upper loop of cable 58 extends through each slat 26 around forward pulley 38 and rear pulley 50 and through hollow lateral support members 24.

As may be seen, the tension on the cables 58 may be adjusted by adjusting the nut 63 positioned on threaded rod 62. It should be noted that forward pulleys 38 and rear pulleys 50 are fully contained within the lateral truck frame and do not extend laterally therefrom. This has distinct advantage in lessening damage to these pulleys and also contains the pulleys within the legal width of the truck which is regulated frequently by state law. Pennsylvania state law requires the truck width to be no more than 96 inches.

The forward and rearward movement of the tarpaulin 28 over the top of the truck bed 12 is controlled by a hand crank device 64 (FIGS. 2, 4, 5 and 6), and is mounted upon the forward position of front wall 18 by means of mounting bracket 66. A crank shaft 68 extends through two bearings 70 which are attached to mounting bracket 66. A chain sprocket 72 is positioned on crank shaft 68 between bearings 70. Removable hand crank 74 has a hollow tube portion 75 attached which slides easily over the end portion of crank shaft 68. Notches 77 in the end of tube portion 75 engage a permanent shaft pin 76 which extends outwardly from crank shaft 68. Thus the hand crank can be inserted on crank shaft 68 to engage shaft pin 76 and turn the crank shaft 68. Upon completion of use, the hand crank 74 is completely removed so as not to protrude laterally from the side of the truck 10.

As shown in FIG. 2 and 6, a looped chain 78 extends about the chain sprocket 72 and about an axle sprocket 80 positioned on short shaft 44. As may be seen, when the hand crank 74 rotates chain sprocket 72, chain 78 will rotate axle sprocket 80 and hollow shaft 40. Cables 58 will then cause rear slat 60 to extend or retract the tarpaulin 28.

Figure 11:
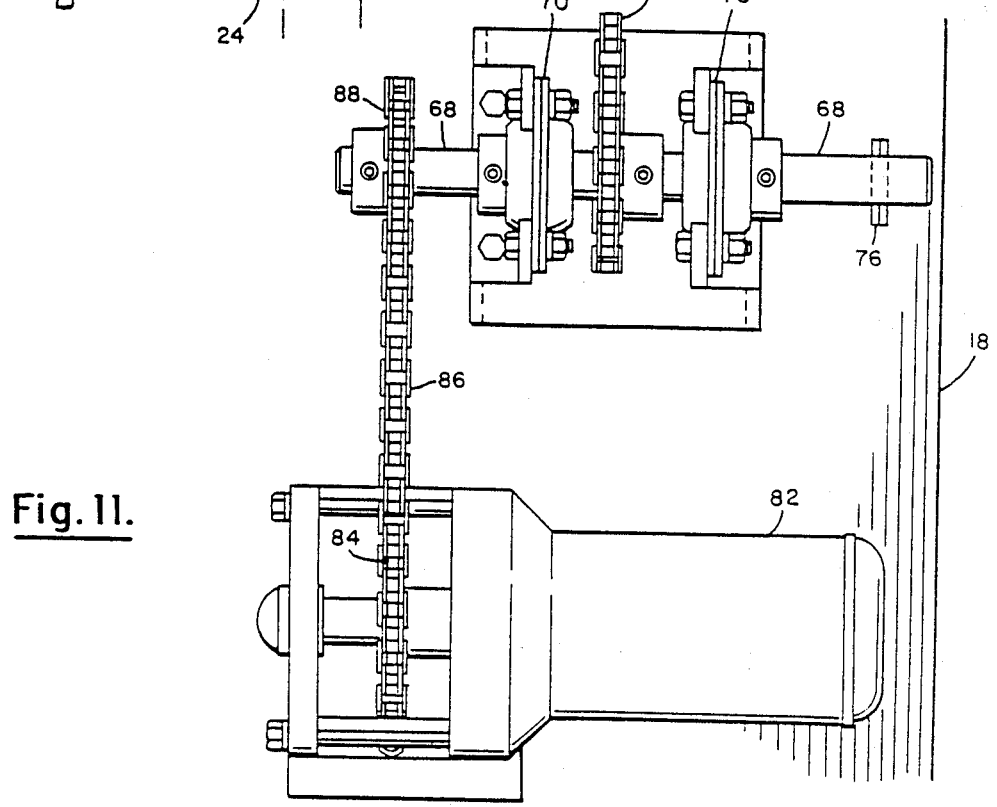
FIG. 11, is a lateral view of the optional electrical drive system which may be utilized in place of the hand crank system.

Alternatively, an electric motor 82 may be substituted for hand crank device 64 (FIG. 11). Electric motor 82 is of a reversible type which may be activated by motor switches (not shown) to extend or retract the tarpaulin 28 as did the hand crank device 64. Electric motor 82 has a motor sprocket 84 and motor chain 86 connected to an auxiliary sprocket 88 upon crank shaft 68.

In operation either hand crank 74 or electric motor 82 may be used to rotate crank shaft 68 which in turn rotates shaft 40. Shaft 40 then rotates forward pulleys 38 which cause cables 58 to extend or retract attached rear slat 60. Rear slat 60 extends or retracts the tarpaulin 28 to cover or uncover the truck bed 12.

It should be noted that the upper sides of truck bed 12 are completely covered by the tarpaulin 28 extending over L-shaped lateral tarpaulin supports 32. Likewise the truck bed 12 is completely covered and sealed or shielded by tarpaulin 28 at the front portion of the truck by the attachment of the tarpaulin 28 to the cab shield 20. The rear of the truck is likewise sealed or shielded and covered by stationary tarpaulin 35 which seals or shields the truck bed 12 in the rear portion. The truck bed 12 is thus completely sealed or shielded from the outside when the tarpaulin 28 has been extended completely over the truck bed 12. No other known similar invention accomplishes this total sealing or shielding.

Total covering and sealing or shielding is important in covering such truck loads as asphalt or other volatile mixtures as well as sand, gravel and the like. Some states (Pennyslvania) require that the truck bed of asphalt containing trucks be completely covered and sealed or shielded from the outer atmosphere. Truck bed sealing or shielding devices which do not create this total seal or shield may not legally operate in such states. Further, the present invention is contained solely within the lateral limits of the truck bed 12. No protruding devices extend laterally from the truck 10, hence the legal width of the truck is not compromised nor are extending parts damaged.

In operation hollow tube 75 of removable hand crank 74 is placed over crank shaft 68 allowing notches 77 to engage shaft pin 76. Assuming that the truck cover is in the open position, removable hand crank 74 is turned, turning shaft 68 and attached shain sprocket 72, turning chain 78 which rotates short shaft 44, hollow shaft 40 and forward pulleys 38. Attached cable 58 then moves pulling rear slat 60 and attached tarpaulin 28 toward the rear of the truck bed 12. Rear slat 60 and attached tarpaulin 28 pass over stationary tarpaulin cover 35 and abut rear pulleys 50 thus sealing or shielding the rear of bed 12. L-shaped lateral tarpaulin supports 32 and attached tarpaulin 28 extend downwardly over the outer side walls 14 completely covering and sealing or shielding the interior of bed 12 from the outside. Reversing the direction of the removable hand crank 74 will cause cable 58 to pull rear slat 60 and attached tarpaulin 28 toward the front wall 18, thus exposing the interior of bed 12.

Although the invention has been applied specifically to truck beds, it is contemplated that it may be used to cover other enclosures as well, such as bins, cans or containers, or used as roof covering for buildings, trailers or the like. The device has been described with certain specificity. It is understood, however, that numerous modifications may be made without departing from the spirit of the invention.

Figure 10A:
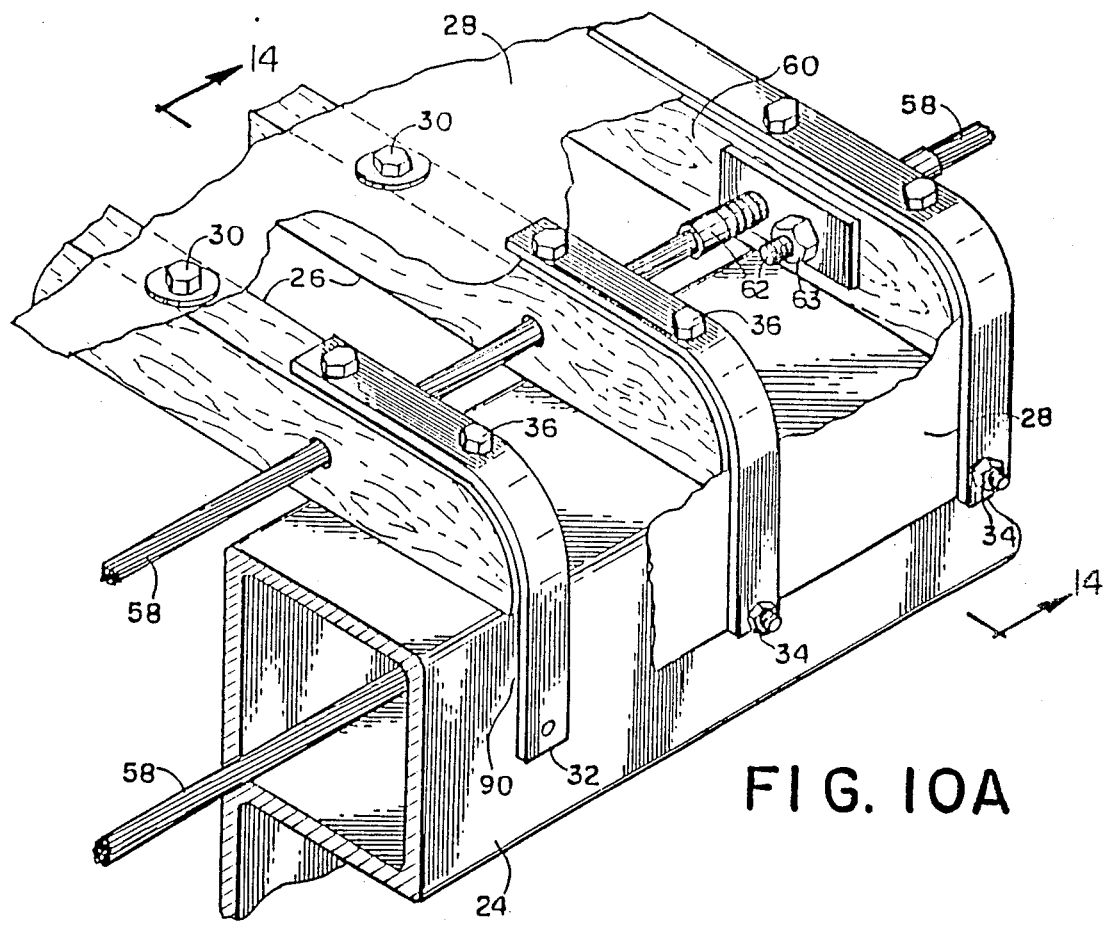
FIG. 10A is a partial view in perspective showing the side enclosing feature of the invention.
Figure 14:
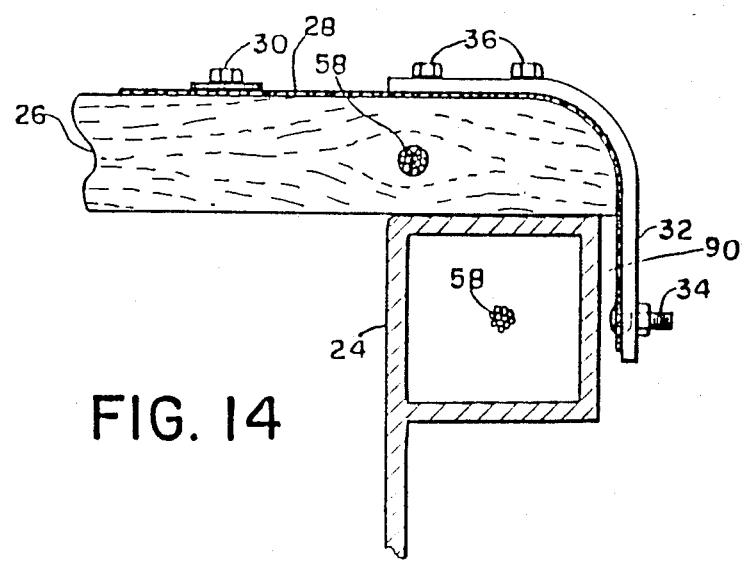
FIG. 14 is a partial view in section taken along lines and arrows 14—14 of FIG. 10A.

Referring now to FIGS. 10A and 14 which illustrate a partial view in perspective of a side enclosing feature of the invention, there is shown tarpaulin 28 held against the interior surface of supports 32 by bolts 34, and held close to the side wall support members 24 of the truck by lateral tarpaulin supports 32.

The ends of slats 26 extend only minimally beyond the outer edges of the truck side wall lateral support members 24 to create an operating clearance or gap 90 between the side portions of tarpaulin 28, together with lateral tarpaulin supports 32, and the truck side wall lateral support members 24 such that tarpaulin 28 may be easily extended or retracted over the truck bed 12 without a binding problem, that is, without the trapaulin 28 becoming jammed as it is extended or retracted over the truck bed 12. Preferably, gap 90 is approximately one-half inch. As shown in FIG. 14, since the bolt head of each bolt 34 is countersunk into the corresponding lateral tarpaulin support 32, the bolt head does not extend inwardly towards the truck side wall lateral support members 24 to an extent that it interferes with extension or retraction of the tarpaulin 28 over the truck bed 12.

Since gap 90 is very small, the flow of air into or from the truck bed 12 through gap 90 is correspondingly small. Accordingly, the sides of truck bed 12 are substantially enclosed or covered thereby limiting the passage of air into or from truck bed 12. Accordingly, when tarpaulin 28 is in a fully extended position, the truck bed 12 is substantially completely enclosed, and the contents of the truck bed are shielded from the atmosphere outside the truck bed.

I claim:

1. A slidable truck cover assembly for covering the open bed of a truck having side, front and rear walls, comprising front pulleys mounted to the front portion of the truck bed, an axle connecting the front pulleys, rear pulleys mounted to the rear portion of the truck bed, cables extending between the front pulleys and the rear pulleys in looping relationship, a plurality of slats extending between said cables and attached thereto in a slipping relationship, cable connecting means for connecting the cables to a slat, a tarpaulin attached to the slats, the tarpaulin having side portions that extend over the side walls of the truck, a lateral tarpaulin support mounted on the end of each slat over the tarpaulin and extending downwardly over and adjacent to the side walls of the truck for holding the side portions of the tarpaulin close to the side walls of the truck, and bi-directional rotating means for rotating the axle.

2. The slidable truck cover assembly of claim 1, the bi-directional rotating means including a hand crank, a hand crank sprocket connected to said hand crank, an axle sprocket attached to said axle, and a chain connecting said hand crank sprocket to said axel sprocket.

3. The slidable truck cover assembly of claim 2, in which the tarpaulin operating mechanism is substantially contained within the lateral width of said truck bed.

4. The slidable truck cover assembly of claim 2, in which the rotating mechanism controlling the tarpaulin longitudinal movement is contained within the width of the truck bed.

5. The slidable truck cover assembly of claim 2, in which the mechanism of the present invention is substantially contained within the truck bed.

6. A slidable truck cover assembly for covering the open bed of a truck having side, front and rear walls, comprising front pulleys mounted to the front portion of the truck bed,
    an axle connecting the front pulleys,
    rear pulleys mounted to the rear portion of the truck bed,
    cables extending between the front pulleys and the rear pulleys in looping relationship,
    a plurality of slats extending between said cables and attached thereto in a slipping relationship,
    cable connecting means for connecting the cables to a slat,
    a tarpaulin attached to the slats,
    the tarpaulin having side portions that extend over the side walls of the truck,
    a lateral tarpaulin support mounted on the end of each slat over the tarpaulin and extending downwardly over and adjacent to the side walls of the truck for holding the side portions of the tarpaulin close to the side walls of the truck, and
    bi-direction rotating means for rotating the axle,
    the bi-directional rotating means including
    a hand crank,
    a hand crank sprocket connected to said hand crank,
    an axle sprocket attached to said axle, and
    a chain connecting said hand crank sprocket to said axle sprocket,
    the tarpaulin operating mechanism being substantially contained within the lateral width of said truck bed,
    the rotating mechanism controlling the tarpaulin longitudinal movement being contained within the width of the truck bed, and
    the mechanism of the present invention being substantially contained within the truck bed.

7. A cover assembly for the open bed of trucks where the truck bed has side, front and rear walls, and a cab shield, comprising in combination:

front pulleys mounted to the front portion of said truck bed;
    an axle connecting said front pulleys;
    rear pulleys mounted to the rear portion of said truck bed;
    cables extending between said front pulleys and said rear pulleys in looping relationship;
    a plurality of slats extending between said cables and attached thereto in a slipping relationship;
    cable attaching means connecting said cables with said slats;
    lateral sealing means attached to the end portion of said slats and extending over the lateral surface of said side walls;
    a tarpaulin attached to said slats and extending over the side walls of the truck;
    said lateral sealing means including a lateral tarpaulin support mounted on the end of each slat over the tarpaulin and extending downwardly over and adjacent to the side walls of the truck;
    front sealing means attaching said tarpaulin to said cab shield in a sealing relationship;
    rear sealing means attached to the rear portion of said truck bed and extending over the rear wall in a sealing relationship;
    bi-directional rotating means connected to said axle.

8. A slidable truck cover assembly for covering the open bed of a truck having side, front and rear walls, comprising front pulleys mounted to the front portion of the truck bed,
    an axle connecting the front pulleys,
    rear pulleys mounted to the rear portion of the truck bed,
    cables extending between the front pulleys and the rear pulleys in looping relationship,
    a plurality of slats extending between said cables and attached thereto in a slipping relationship,
    cable connecting means for connecting the cables to a slat,
    a tarpaulin attached to the slats,
    the tarpaulin having side portions that extend over the side walls of the truck,
    side holding means for holding the tarpaulin side portions close to the side walls of the truck and for minimizing the space between the tarpaulin side portions and the side walls of the truck to limit the passage of air into or from the truck bed via the space between the tarpaulin side portions and the side walls of the truck while permitting the tarpaulin to be extended and retracted freely over the truck bed,
    the side holding means including a lateral tarpaulin support mounted on the end of each slat over the tarpaulin and extending downwardly over and adjacent to the side walls of the truck for holding the side portions of the tarpaulin close to the side walls of the truck, and
    bi-directional rotating means for rotating the axle.

9. The slidable truck cover assembly of claim 8,
the bi-directional rotating means including
    a hand crank,
    a hand crank sprocket connected to said hand crank,
    an axle sprocket attached to said axle, and
    a chain connecting said hand crank sprocket to said axle sprocket.

10. The slidable truck cover assembly of claim 9, in which the tarpaulin operating mechanism is substantially contained within the lateral width of said truck bed.

11. The slidable truck cover assembly of claim 9, in which the rotating mechanism controlling the tarpaulin longitudinal movement is contained within the width of the truck bed.

12. The slidable truck cover assembly of claim 9, in which the mechanism of the present invention is substantially contained within the truck bed.

13. The slidable truck cover assembly of claim 1, the space between the tarpaulin side portions and the side walls of the truck being approximately one-half inch.

14. The slidable truck cover assembly of claim 8, the space between the tarpaulin side portions and the side walls of the truck being approximately one-half inch.

15. The slidable truck cover assembly of claim 8,
the bi-directional rotating means including
    a hand crank,
    a hand crank sprocket connected to said hand crank,
    an axle sprocket attached to said axle, and
    a chain connecting said hand crank sprocket to said axle sprocket,
    in which the tarpaulin operating mechanism is substantially contained within the lateral width of said truck bed,
    in which the rotating mechanism controlling the tarpaulin longitudinal movement is contained within the width of the truck bed, and
    in which the mechanism of the present invention is substantially contained within the truck bed.

* * * * *